United States Patent [19]

Collier et al.

[11] 4,284,127
[45] Aug. 18, 1981

[54] CARPET CLEANING SYSTEMS

[75] Inventors: David S. Collier, Islington; Allan S. Muxworthy, Mississauga, both of Canada

[73] Assignee: Syd W. Collier Company Limited, Toronto, Canada

[21] Appl. No.: 44,566

[22] Filed: Jun. 1, 1979

[51] Int. Cl.³ .................. G05D 23/00; A47L 11/34
[52] U.S. Cl. ........................... 165/35; 165/51; 237/12.3 R; 15/321; 239/129; 239/130; 134/107
[58] Field of Search ............... 165/35, 51, 52; 237/12.3 R; 126/19.5; 239/129, 130; 15/320, 321; 134/105, 107; 123/445

[56] References Cited

U.S. PATENT DOCUMENTS

| | | | |
|---|---|---|---|
| 1,986,893 | 1/1935 | Hasbrouck et al. | 165/35 |
| 2,103,947 | 12/1937 | Holmes | 165/35 |
| 2,903,189 | 9/1959 | Patton | 239/129 |
| 3,092,325 | 6/1963 | Brown et al. | 165/35 |
| 3,131,757 | 5/1964 | Bergstrom et al. | 165/35 |
| 3,223,150 | 12/1965 | Tramontini | 165/35 |
| 3,341,081 | 9/1967 | King | 165/51 |
| 3,556,402 | 1/1971 | Wolking | 239/130 |
| 4,109,340 | 8/1978 | Bates | 15/321 |
| 4,190,205 | 2/1980 | Mitchell | 239/129 |
| 4,196,854 | 4/1980 | Prucyk | 239/129 |

*Primary Examiner*—Albert W. Davis
*Assistant Examiner*—Margaret A. Focarino

[57] ABSTRACT

The specification describes an arrangement adapted for use in a carpet cleaning system and more particularly, an arrangement in which the heat given off by an internal combustion engine, is used through heat transfer to heat cleaning fluid of the carpet cleaning system. The cleaning fluid is carried in its own conduit so that it is maintained out of contact from the engine itself. The bulk of the heat picked up by the cleaning fluid is through heat transfer at the exhaust of the engine although, a preheat may also be incorporated from heat transfer at the engine's cooling system. Shutdown controls are provided to automatically shut the system down in case of malfunction, to ensure that the system does not overheat.

11 Claims, 6 Drawing Figures

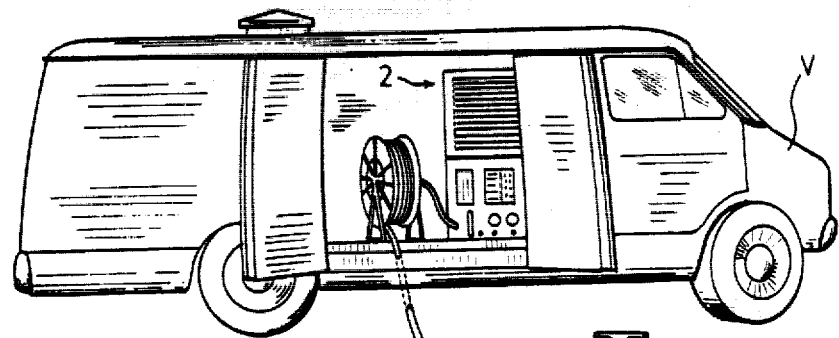
FIG.1.
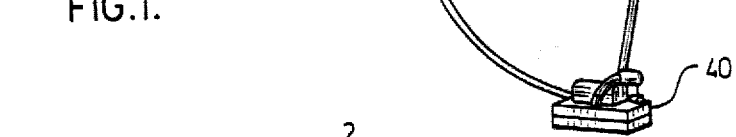
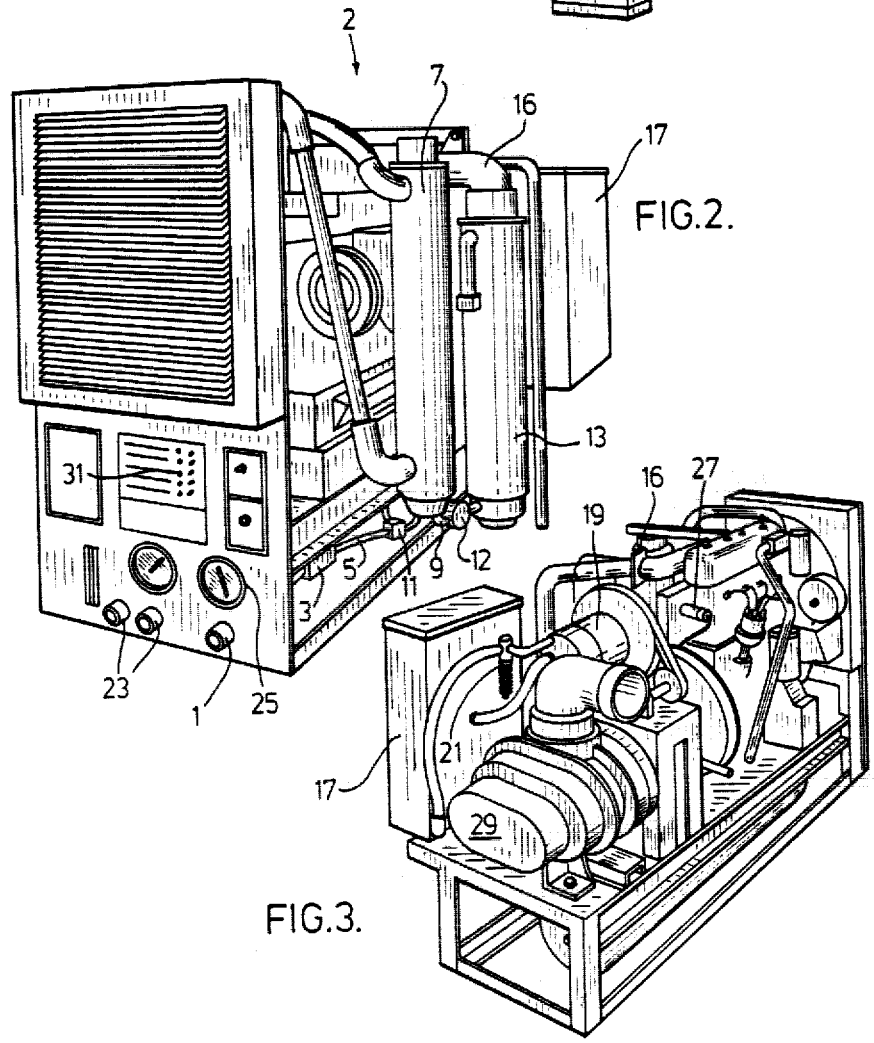
FIG.2.
FIG.3.

CARPET CLEANING SYSTEMS

FIELD OF THE INVENTION

The present invention relates to a system particularly suited for use in a carpet cleaning system wherein the carpet cleaning fluid is heated by means of heat transfer from an internal combustion engine used to drive the system.

BACKGROUND OF THE INVENTION

In the past, no significant progress has been made to use the heat generated by internal combustion engines to heat a liquid medium. For instance, in carpet cleaning systems, where heated cleaning solution is required, the use of an internal combustion engine is highly desirable because it gives off significant heat energy which can be transferred to heat the cleaning solution. Furthermore, an internal combustion engine is fully portable and is not dependent upon an alternate power source so that it is suited to a mobile carpet cleaning system.

One of the few exceptions to the prior art discussed above is U.S. Pat. No. 4,109,340 issued Aug. 29th., 1979 to Leonard Eugene Bates, disclosing an arrangement in which the cleaning fluid itself, is used as the engine coolant and as such, picks up heat from the lubricating oils in the engine. The Bates Patent further goes on to disclose that some type of use may be made of the exhaust heat to further heat the coolant if necessary.

Although the Bates system is an advance over the prior art, it still suffers from some serious drawbacks. Firstly, the cleaning agents added to the cleaning solution are generally considered to be extremely caustic and as such, detrimental to the engine. Secondly, because the cleaning solution actually replaces the coolant in the Bates system, it runs throughout the engine and picks up contaminants in the cooling system. As anyone who has flushed an engine rad will appreciate these cooling systems, particularly through corrosion, become extremely dirty. From this standpoint, the Bates' system is no different from any other conventional rad cooled system, thereby presenting obvious contamination of the cleaning solution problems.

With regards to the use of the exhaust for heating the cleaning fluid, Bates makes no more than a mention that the exhaust gases developed by the engine can be used when desired for some additional heating of the coolant cleaner. Nothing further is disclosed with respect to what mechanisms are used to control the heat exchange from the exhaust gases to the cleaning fluid. Furthermore, because the exhaust is the area in which the greatest heat is generated from the engine, it would be desirable to have a system which relies primarily on the exhaust for efficiently heating the cleaning fluid of the carpet cleaning system.

The present invention provides such an arrangement without suffering from any of the drawbacks disclosed above and at the same time, making the best use of the heat given off by an internal combustion engine. The present invention's system relies upon heat exchange from the engine exhaust to heat a fluid medium which is conducted through an exhaust heat exchanger and maintained at all times in its own fluid conduit out of contact with the contaminant exhaust gases.

The exhaust gases of the internal combustion engine provide enough heat to raise the temperature of the fluid medium to unacceptably high limits if left uncontrolled. Furthermore, for some job applications such as carpet cleaning, it is desirable to maintain the medium in the liquid state.

The system is therefore, further provided with temperature sensing means when the temperature of the fluid medium from the heat exchanger has reached a predetermined desired level as well as controls responsive to the temperature sensing means for ensuring that the temperature of the fluid medium does not exceed that desired level.

Examples of these controls could include a bypass at the heat exchanger which is operated by the temperature sensing means to bypass the heated exhaust away from the heat exchanger and/or automatic shutdown controls to shut the entire system down in the event of system malfunction.

Unlike the Bates system, the present invention does not require heating of the fluid medium directly at the engine block, although this may be used as a preheat prior to reaching the exhaust heat exchanger if desired. However, even when the preheat is used in the present invention it is completely different from the Bates system, in that the fluid medium is not used as the engine coolant but rather, is again carried in its own cleaning fluid conduit through a heat exchanger, into which the heated engine coolant is directed. The fluid medium of the present invention is therefore, maintained free of impurities which would otherwise be picked up from the engine block and as such, has maximum efficiency as a cleaning agent.

BRIEF DISCUSSION OF THE DRAWINGS

The above, as well as other features and advantages of the present invention will be described in greater detail according to the preferred embodiments of the present invention wherein:

FIG. 1 shows a van used for transporting a mobile carpet cleaning system according to the present invention;

FIG. 2 shows a perspective view from the front of an internal combustion engine according to an aspect of the present invention;

FIG. 3 shows a rear perspective view of the engine shown in FIG. 2;

DETAILED DESCRIPTION ACCORDING TO THE PREFERRED EMBODIMENTS

Figure 6:
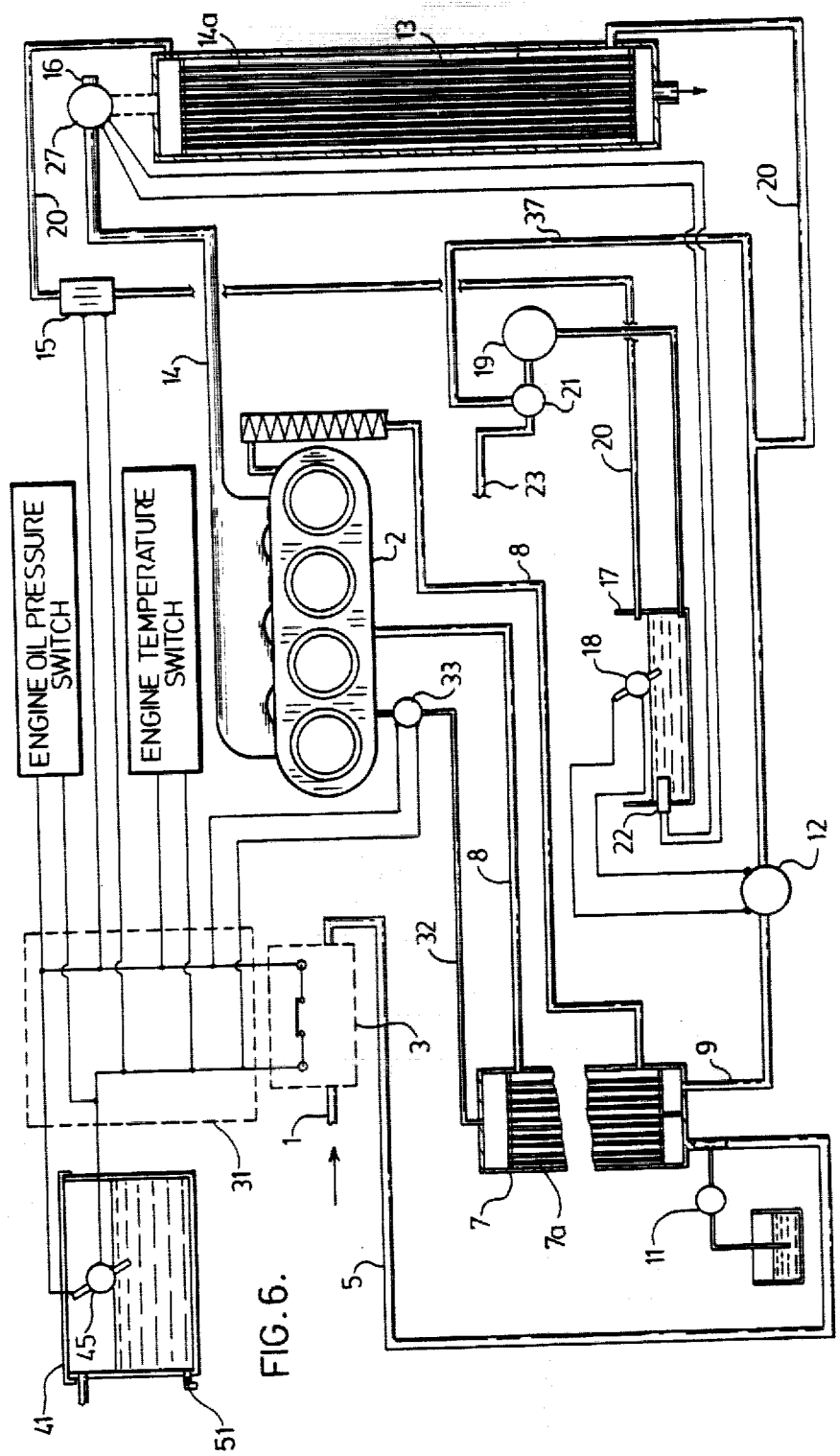
FIG. 6 is a schematic view of an engine arrangement used for driving the system of FIG. 4 and more specifically, for the heating of cleaning fluid according to a preferred aspect of the present invention.

The arrangements shown in FIGS. 2, 3 and 6 show the use of both preheater and an exhaust heater for heating the cleaning fluid in a carpet cleaning system. However, as mentioned above, the exhaust heater itself provides more than enough heat to raise the temperature of the cleaning fluid to desired cleaning levels and as such, provides the primary heating function.

Referring to the drawings, FIGS. 2 and 3 show a conventional internal combustion engine provided with supplementary features for use in providing the present engine.

FIG. 6 shows the flow chart for both the cleaning fluid and the engine coolant as well as the inter-relationship of these supplementary components.

The system incorporates the use of a conventional internal combustion engine 2 provided at its forward end with a water entry 1. The water entry is provided with a quick disconnect coupling for connection to any standard water supply such as a hose or the like. Once the water entry is coupled to the water supply, the supply pressure is sensed by a water pressure switch 3 mounted directly behind the water entry quick disconnect coupling. This pressure switch acts as a safety shutdown as will be explained later in detail.

After passing through the pressure switch, the supply water passes a chemical injector 11 which injects a metered amount of chemical into the supply water thereby converting it to a cleaning solution.

The cleaning solution continues its flow through line 5 and enters the bottom of preheater 7 where it flows in a 4 pass up down system through a plurality of small tubes 7a within the preheater. The preheater is also fed with heated engine coolant through closed loop line 8 extending from and continuing back to the engine 2. This heated engine coolant surrounds the series of tubes in the preheater and by virtue of its increased temperature, i.e. in the order of 180° F., heats the cleaning solution in the tubes without contaminating it.

After the cleaning solution has been heated in the preheater, it flows outwardly from the base of the preheater through a further supply line 9 to solenoid valve 12 and from there along supply line 20 which extends to an exhaust heat exchanger 13.

FIG. 6 best shows the exhaust heat exchanger. The cleaning solution enters from the side of the heat exchanger and flows upwardly and out of the heat exchanger near its upper end. The heat exchanger itself is provided with a plurality of small tubes 14A which are fed with the exhaust gases by means of exhaust manifold extension 14 and around which the cleaning solution flows. The solution becomes increasingly warmer as it rises in the exhaust heat exchanger through heat exchange with the exhaust gases which reach temperatures up to 1700° F. The solution is subject to the greatest amount of heat immediately before leaving the upper end of the exchanger.

After leaving the heat exchanger the heated solution then flows to a solution holding tank 17 which is provided with a float reed switch 18 to maintain an essentially constant solution level in the tank and to ensure that the tank is not overfilled. This reed switch controls the operation of solenoid valve 12 and is set to close the solenoid valve once the level in the tank reaches the maximum desired level.

The temperature of the cleaning solution is determined by means of a thermostat setting 25, shown in FIG. 2. the thermostat continually senses the temperature of the solution by means of a temperature sensor 22 at the solution tank. When the temperature of the solution reaches the setting of the thermostat, the thermostat control operates an exhaust bypass solenoid 27, which in turn moves an exhaust bypass valve 16 to direct the exhaust gases away from heat exchanger 13. Bypass valve 16 remains in the bypass position shown in FIG. 6 until the temperature in the solution tank falls below the thermostat setting at which time, the exhaust gases are again, redirected to the exhaust heat exchanger. There is a time delay in the redirecting of the bypass flapper back to the exchanger of about 10 seconds to prevent damage to the bypass flapper power source.

Figure 4:
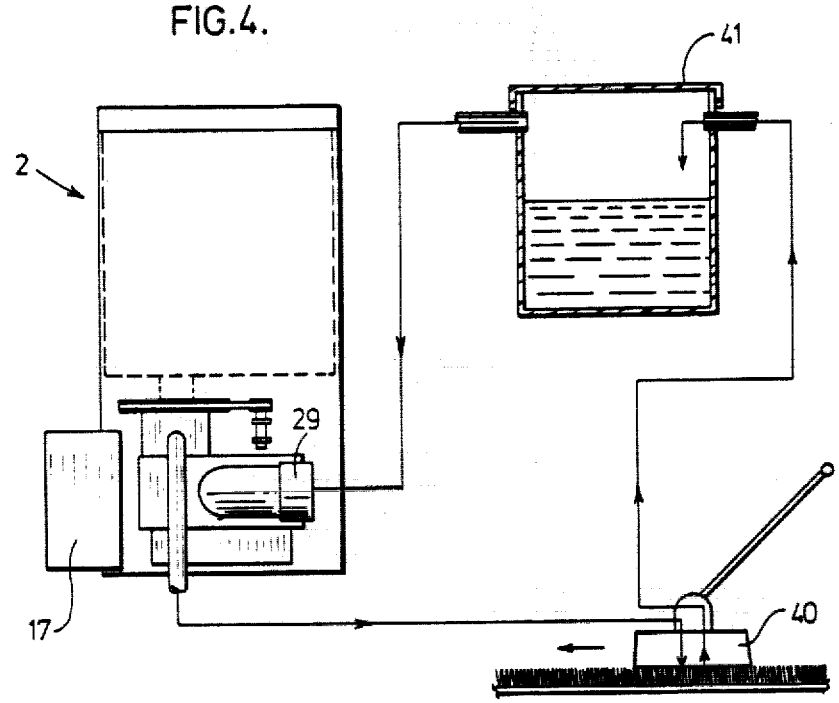
FIG. 4 is a schematic view of the overall system according to an aspect of the present invention.
Figure 5:
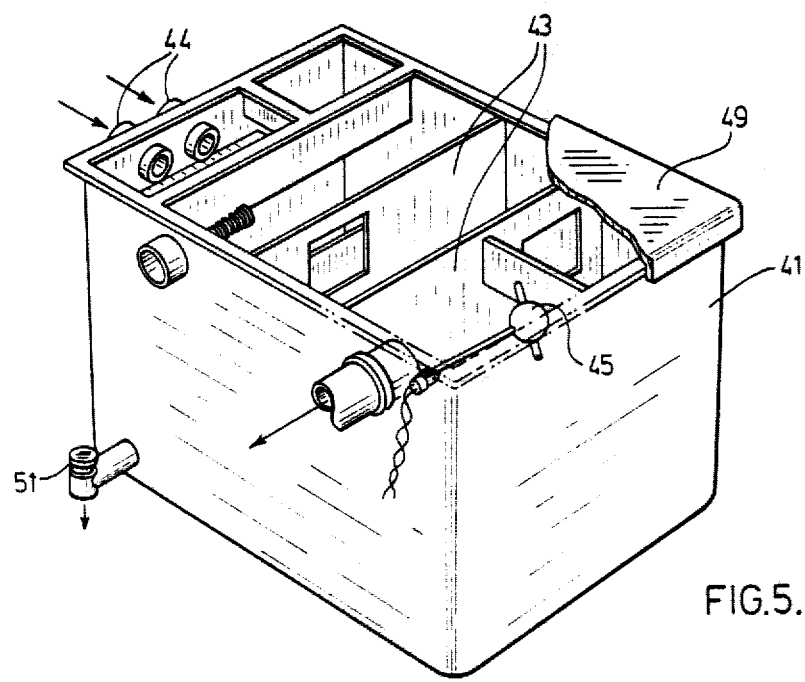
FIG. 5 is a perspective view looking down on a recovery tank of the system shown in FIG. 4.

The heated solution is drawn from the solution tank by means of high pressure water pump 19, which runs constantly and pumps the solution through pressure flow unloader valve 21 shown in FIG. 3, which automatically determines whether the solution is to be directed to the cleaning tool 40, shown in FIGS. 1 and 4 through outlet 23 or recirculated once again, through recirculation line 37, to the exhaust heat exchanger before returning to the solution tank on the recirculation cycle.

As described above, when the solution tank is full solenoid valve 12 is closed by means of reed switch 18, discontinuing water entry. However, because the cleaning solution provides a coolant in the exhaust heat exchanger there should be solution flow through the exchanger at all times, particularly when the exhaust is not being bypassed, otherwise the internal temperature of exchanger 13 could rise to a level where the copper tubes would melt. Even in an application where steam is produced by the heat exchange the fluid flow through the heat exchanger continues to act as coolant because the steam is still at a much lower temperature than the exhaust gases. Therefore, during the no water entry cycle, the unloader valve ensures that excess solution drawn off the solution tank by the water pump is directed through line 37 and back to the exhaust heat exchanger 13. This ensures that there is fluid flow through the exhaust heat exchanger at all times to keep the temperature of the heat exchanger at an acceptable level and at the same time, provides a continual heating process in which most of the fluid passes through the exhaust heat exchanger several times before being used.

In the event that there was a malfunction for some reason or other, the system includes a number of safety features monitored by a monitor system 31 shown in FIG. 2 to prevent damage to the exhaust heat exchanger. The first of these features is the provision of the water pressure switch 3 which continually monitors the incoming water pressure and in the event of water pressure failure, sends a signal to the monitoring system which will turn the machine off. Further to the water pressure switch, a temperature sensor 15 is also provided, which senses the temperature of the solution flowing through line 20 and which only reacts to an extreme heating condition indicative of a malfunction in the heating system such as poor solution flow. Sensor 15 is again monitored by the monitoring system which automatically shuts the engine down when a readout is received from the sensor. The combination of water pressure sensor switch 13 and temperature sensor 15 ensures that no malfunction in the system causes damage to the exhaust heat exchanger.

In addition to the functions described above, the monitoring system also monitors engine oil pressure and overall engine temperature to determine any malfunctions in these areas. When there is a malfunction, and the automatic shutoff controls are activated, the engine will shut down with the throttle wide open. Normally, dieseling or runon which arises in any internal combustion engine, suddenly switched off with the throttle open would occur. However, the combustion engine of the present invention is provided with an injector 33 injecting a fine warm solution spray from line 32 into the intake manifold to render the combustible gases useless and prevent dieseling so that once the engine is switched off, it does not runon.

The system of the present invention further includes manually operable cleaning tool 40 as well as solution recovery tank 41. The engine, cleaning tool and recovery tank are all carried as a mobile unit in a van indicated at V, directly to the job site. The cleaning tool is hooked up via outlet connection 23 to the engine which by virtue of its high horsepower level is able to operate the cleaning tool at distances up to 1000 feet. Cleaning tool 40 is connected to recovery tank 41 which is in turn connected to vacuum pump 29 operated by the engine and shown in FIG. 3. The vacuum pump continually draws air at high velocity through the recovery tank for the recovery of soiled solution from the cleaning tool.

The recovery tank 41 is adapted to separate the soiled cleaning solution from air, which is drawn at high velocity through a series of baffles 43 inside the recovery tank. These baffles cause the solution and dirt to fall into the tank leaving relatively clean air to pass through a filter (not shown) before being drawn into the vacuum pump.

The recovery tank is generally provided with a float reed switch 45 which is again monitored by monitoring system 31 to automatically turn the engine off when the recovery tank is filled with solution. The vacuum pressure within the tank is controlled by a vacuum relief valve 47 which opens at a predetermined pressure of say, 16 inches of mercury to ensure that the maximum vacuum in the tank does not exceed that level.

The lid of the vacuum recovery tank is removable to facilitate cleaning and houses a transparent plexiglass* filtercover 49 to allow for visual air filter inspection.
*Trade Mark Draining of the vacuum recovery tank is fast and simple. The tank is equipped with a twist on drain hose and gate valve 51 which when open, will empty the soiled solution of for example, 85 gallons in approximately 50 seconds. This rapid ejection results in the removal of most sediment from the bottom of the tank.

As shown in the drawings, the engine may be provided with two water outlets 23 and the recovery tank provided with two vacuum inlets 44 in which case, two cleaning tools can be simultaneously operated. This is again, made possible by the provision of the high power source and the efficient heating system according to the present invention.

Although the description above, relates to the use of cleaning solution for a carpet cleaning system, it will be appreciated that the engine arrangement with both its preheat and exhaust heat transfer mechanisms can be used in various other applications where it is desired to heat a liquid medium whether or not it be for cleaning purposes. Furthermore, the examples of construction materials and operating parameters are no way limiting to the present invention so that although, various preferred embodiments of the invention have been described herein in detail, it will be apparent to one skilled in the art that variations may be made thereto, without departing from the spirit of the invention or the scope of the appended claims.

The embodiments of the invention in which an exclusive property or privilege is claimed are defined as follows:

1. A fluid heating system for use in an engine having heated engine coolant and heated exhaust, said system comprising a preheater through which the heated engine coolant is conducted, a heater exchanger through which the heated exhaust is directed, fluid conduit means in both the preheater and the heat exchanger to maintain the fluid separately of the heated coolant and exhaust respectively, sensing means for sensing the presence of fluid in the heat exchanger, a temperature sensor, for sensing the temperature of the fluid from the heat exchanger and exhaust bypass for bypassing the heated exhaust away from the heat exchanger when the fluid temperature is at an unacceptably high level as sensed by the temperature sensor and automatic shutdown controls for shutting the engine off in the event of system malfunction.

2. A cleaning solution heating arrangement for use in a carpet cleaning system comprising an engine producing heated engine coolant and heated exhaust, an immersion preheater through which the heated engine coolant is conducted, a heat exchanger at the heated exhaust, liquid conduit means in both said preheater and said heat exchanger for separation of the heated coolant and exhaust respectively from the cleaning solution in the preheater and heat exchanger, a sensor for sensing the presence of cleaning solution in the heat exchanger and for shutting the engine down in the absence of cleaning solution in the heat exchanger, a temperature sensor for sensing the temperature of the cleaning solution from the heat exchanger and a bypass controlled by the temperature sensor for bypassing the heated exhaust from the heat exchanger when the cleaning solution temperature exceeds a preset maximum and for directing the heated exhaust to the heat exchanger when the temperature of the cleaning solution falls below the preset maximum.

3. A system as claimed in claim 2, wherein said internal liquid conduit means consists of a plurality of small tubes immersed within the heated engine coolant in the preheater.

4. A system as defined in claim 2, including a plurality of small tubes extending through the exhaust heat exchanger for conducting the heated engine exhaust therethrough, separately of the cleaning solution.

5. A system as defined in claim 2, including a solution holding tank to which the cleaning solution is supplied from the exhaust heat exchanger and a recirculation line from the solution holding tank to the exhaust heat exchanger, said recirculation line being controlled by valve means.

6. A system as defined in claim 5 wherein the cleaning solution holding tank is provided with a reed float switch and including a cleaning solution entry line which is opened and closed according to the position of the reed float switch in the cleaning solution holding tank.

7. A system as defined in claim 2 including a water supply sensing switch and a further temperature sensor for sensing the temperature of the cleaning solution immediately after it leaves the exhaust heat exchanger and a monitoring system for monitoring said water supply sensing switch and said further temperature sensor and for shutting the system down in the event of a system failure.

8. A system as defined in claim 7 wherein said monitoring system shuts the system down in the event of poor cleaning solution flow through the exhaust heat exchanger.

9. A system as defined in claim 3 including a chemical cleaner injector for injecting a metered amount of chemical cleaner into the water supply.

10. A system as defined in claim 2 including an injector for injecting a fine spray of liquid to the intake manifold of the internal combustion engine in the event that the engine is shutdown to prevent engine runon.

11. A system as defined in claim 4, including a cleaning tool supplied with cleaning solution heated by the internal combustion engine and a vacuum operated recovery tank for recovering cleaning solution dispensed from said cleaning tool.

* * * * *